US008643620B2

(12) United States Patent
Lin et al.

(10) Patent No.: US 8,643,620 B2
(45) Date of Patent: Feb. 4, 2014

(54) PORTABLE ELECTRONIC DEVICE (75) Inventors: Jaoching Lin, Taipei (TW); Gary Lee, Taipei (TW); Linabel Chu, Taipei (TW)

(73) Assignee: Sentelic Corporation, Taipei (TW)

( * ) Notice: Subject to any disclaimer, the term of this patent is extended or adjusted under 35 U.S.C. 154(b) by 73 days.

(21) Appl. No.: 13/437,101

(22) Filed: Apr. 2, 2012

(65) Prior Publication Data

US 2012/0262392 A1  Oct. 18, 2012

(30) Foreign Application Priority Data

Apr. 12, 2011  (TW) .............................. 100112649 A (51) Int. Cl.
*G06F 3/041* (2006.01)
(52) U.S. Cl.
USPC ..... 345/173; 345/156; 178/18.01; 178/18.03; 178/19.01; 178/20.01
(58) Field of Classification Search
USPC ................................ 345/156, 167, 173–183; 178/18.01–18.05, 19.01–19.04, 20.01
See application file for complete search history.

(56) References Cited

U.S. PATENT DOCUMENTS

2005/0162402 A1* 7/2005 Watanachote ................ 345/173
2008/0042985 A1* 2/2008 Katsuhito et al. ............ 345/173

* cited by examiner

*Primary Examiner* — Joe H Cheng
*Assistant Examiner* — Insa Sadio
(74) *Attorney, Agent, or Firm* — Rosenberg, Klein & Lee (57) ABSTRACT A portable electronic device includes: a main module disposed in a main housing; a keyboard mounted on a mounting surface of the main housing and connected electrically to the main module; and a touch input unit mounted to the main housing and connected electrically to the main module. The touch input unit has first, second and third operating areas spaced apart from each other and exposed from the mounting surface of the main housing. The touch input unit generates an input signal corresponding to one touch point on any one of the first, second and third operating areas, and outputs the input signal to the main module such that the main module performs an operation corresponding to the input signal.

13 Claims, 9 Drawing Sheets

PORTABLE ELECTRONIC DEVICE

CROSS-REFERENCE TO RELATED APPLICATION

This application claims priority to Taiwanese Application No. 100112649, filed on Apr. 12, 2011.

BACKGROUND OF THE INVENTION

1. Field of the Invention

The invention relates to a portable electronic device, and more particularly to a portable electronic device having a touch input unit.

2. Description of the Related Art

A conventional notebook computer includes a touch pad, which is substituted for a computer mouse, for cursor control. Such a touch pad cannot generate an input signal associated with any express control, such as volume control, and shrinking/enlarging control for a display page. Thus, a plurality of express keys corresponding respectively to various express functions are designed for a notebook computer and are incorporated into a keyboard of the notebook computer. As a result, the notebook computer must provide a relatively large mounting surface for mounting such a keyboard thereon. In addition, it has been proposed another conventional touch pad operable to generate various input signals corresponding respectively to various express functions based on motion of at least one touch point thereon. However, it is noted that, for the same express function, manufactories of such a conventional touch pad each may define a different operating way corresponding to the same express function, thereby resulting in inconvenience in use.

Therefore, improvements may be made to the above techniques.

SUMMARY OF THE INVENTION

Therefore, an object of the present invention is to provide a portable electronic device having a touch input unit that can overcome the aforesaid drawbacks of the prior art.

According to the present invention, a portable electronic device comprises:

a main housing having a mounting surface;

a main module disposed in the main housing;

a keyboard mounted on the mounting surface of the main housing and connected electrically to the main module; and a touch input unit mounted to the main housing and connected electrically to the main module, the touch input unit having first, second and third operating areas spaced apart from each other and exposed from the mounting surface of the main housing, the touch input unit being capable of generating an input signal corresponding to at least one touch point on any one of the first, second and third operating areas, and outputting the input signal to the main module such that the main module performs an operation corresponding to the input signal from the touch input unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
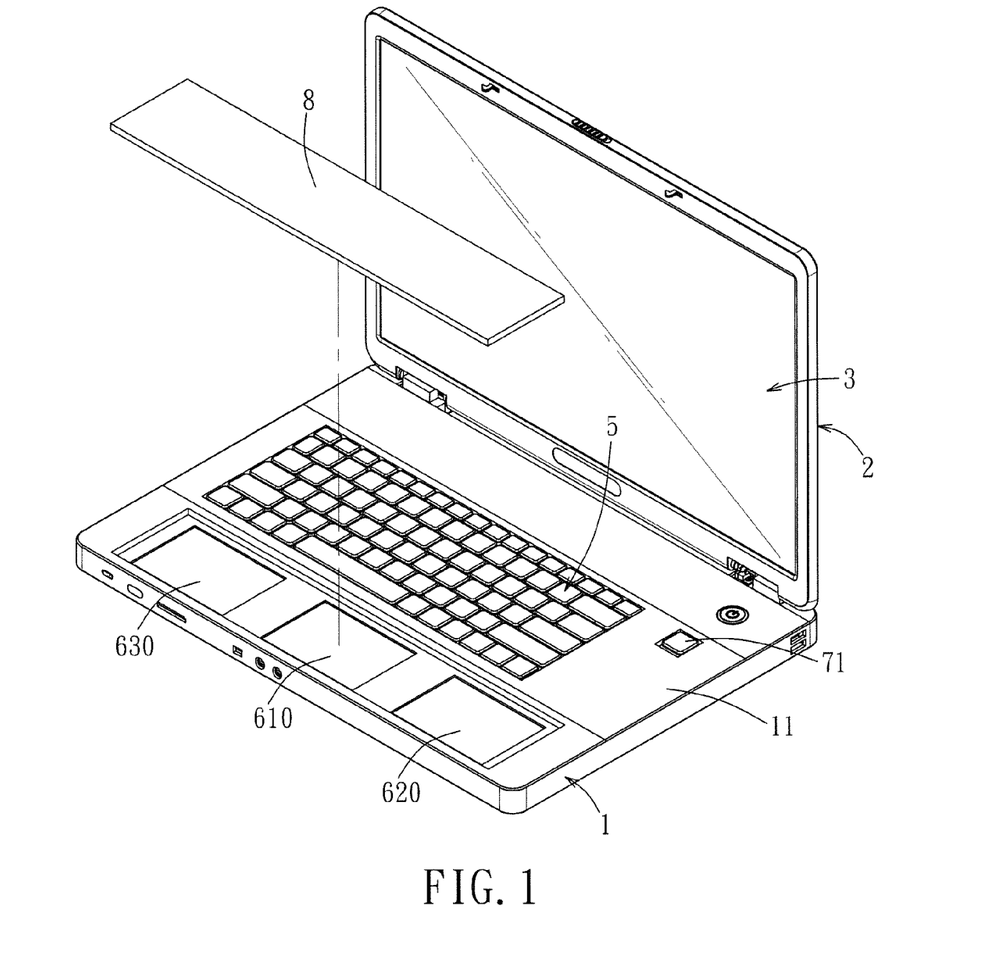
FIG. 1 is a partial exploded perspective view showing the first preferred embodiment of a portable electronic device according to the present invention.
Figure 2:
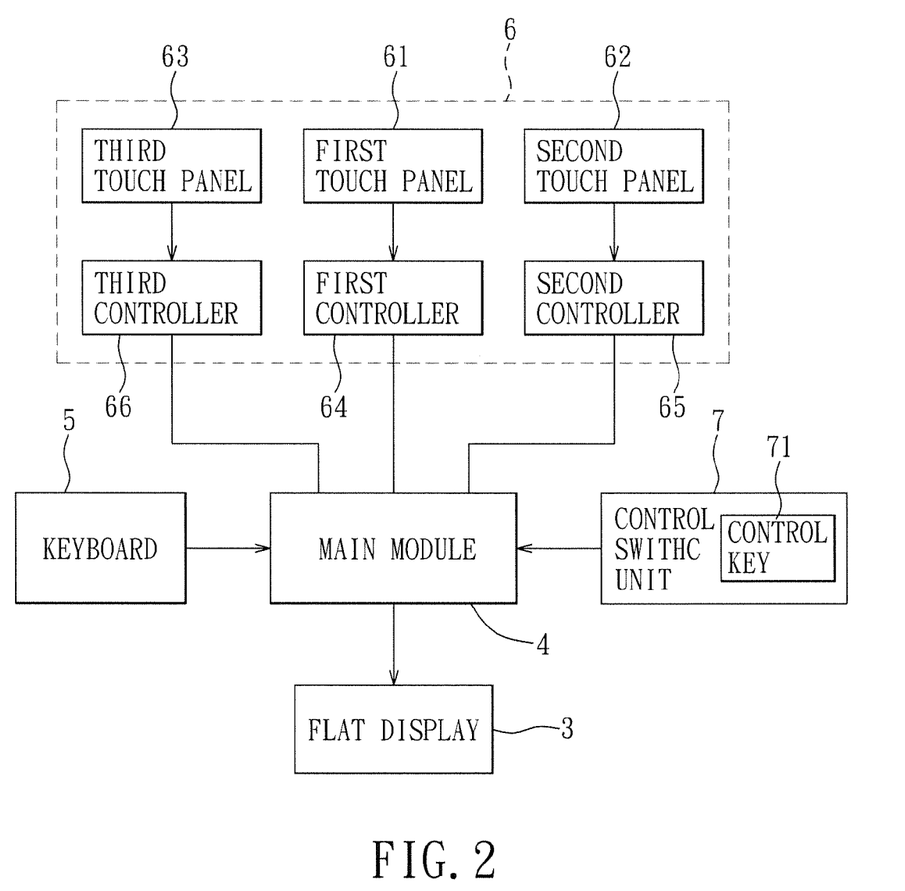
FIG. 2 is a schematic circuit block diagram illustrating the first preferred embodiment.
Figure 3:
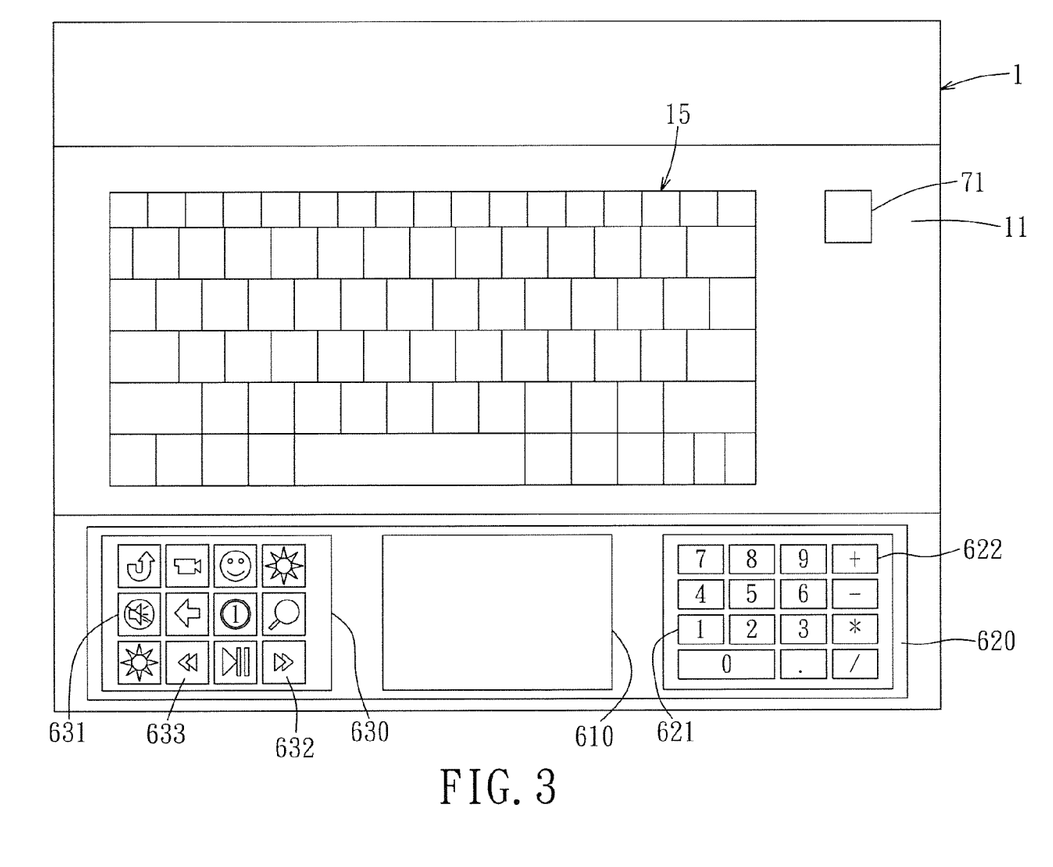
FIG. 3 is a schematic top view showing the first preferred embodiment without a flat display module and a display-mounting housing.

Referring to FIGS. 1 to 3, the first preferred embodiment of a portable electronic device, such as a notebook computer, according to the present invention is shown to include a main housing 1, a display-mounting housing 2, a flat display 3, a main module 4, a keyboard 5, a touch input unit 6, and a control switch unit 7. In other embodiments, the portable electronic device can be a mobile phone or a personal digital assistant.

The main housing 1 has a flat upper surface 11 that serves as a mounting surface.

The display-mounting housing 2 is connected pivotally to the main housing 11, and is operable between a closed position and an open position. The display-mounting housing 2 serves as a cover for covering the upper surface 11 of the main housing 1 when at the closed position.

The flat display 3 is mounted in the display-mounting housing 2, and has a display screen facing the upper surface 11 of the main housing 1 when the display-mounting housing 2 is at the closed state.

The main module 4 is mounted in the main housing 1 and is connected electrically to the flat display module 3.

The keyboard 5 is mounted on the upper surface 11 of the main housing 1, and is connected electrically to the main module 4.

The touch input unit 6 is mounted to the main housing 1, and is connected electrically to the main module 4. The touch input unit 6 has first, second and third operating areas 610, 620, 630 spaced apart from each other and exposed from the upper surface 11 of the main housing 1 (see FIG. 1). The first operating area 610 is disposed between the second and third operating areas 620, 630. The touch input unit 6 is capable of generating an input signal corresponding to at least one touch point on any one of the first, second and third operating areas 610, 620, 630, and outputs the input signal to the main module 4 such that the main module 4 performs an operation corresponding to the input signal from the touch input unit 6. In this embodiment, as shown in FIG. 2, the touch input unit 6 includes a first touch panel 61, a second touch panel 62, a third touch panel 63, a first controller 64, a second controller 65, and a third controller 66.

Figure 4:
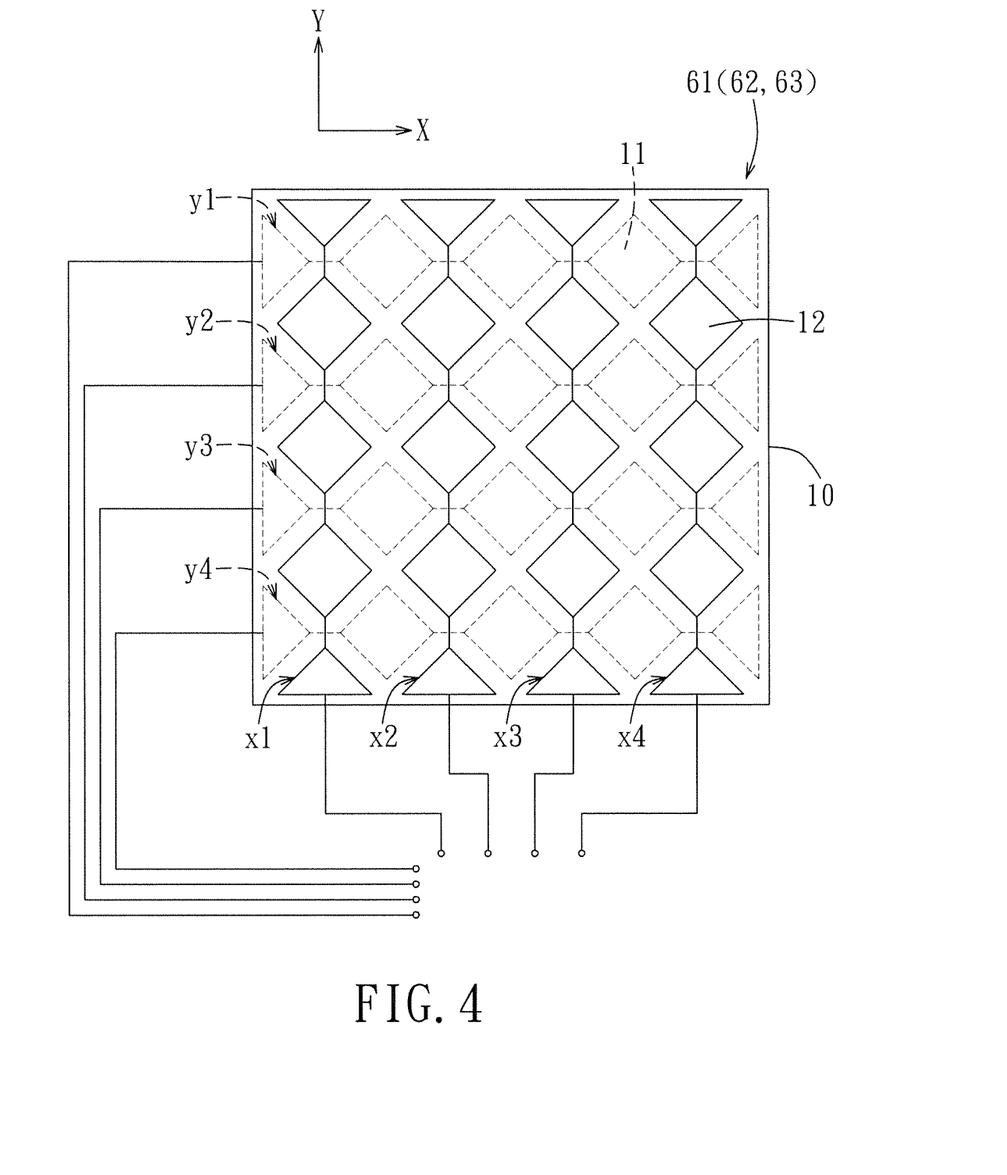
FIG. 4 is a schematic view showing a first touch panel of the first preferred embodiment.

The first touch panel 61 is configured with the first operating area 610, and is operable to generate a first sensing output in response to at least one touch point on the first operating area 610. The second touch panel 62 is configured with the second operating area 620, and is operable to generate a second sensing output in response to at least one touch point on the second operating area 620. The third touch panel 630 is configured with the third operating area 630, and is operable to generate a third sensing output in response to at least one touch point on the third operating area 630. In this embodiment, referring further to FIG. 4, each of the first, second and third touch panel 61 includes a substrate 10, and a first transparent conductive layer (not shown) disposed on the substrate 10, and a second transparent conductive layer (not shown) spaced apart from the first transparent conductive layer by a dielectric layer (not shown). The first transparent conductive layer is formed with a plurality of first electrode strings (y1, y2, y3, y4) extending along a first direction (X) and arranged along a second direction (Y) perpendicular to the first direction (X). Each of the first electrode strings (y1, y2, y3, y4) includes a plurality of first electrodes 11 connected in series. The second transparent conductive layer is formed with a plurality of second electrode strings (x1, x2, x3, x4) extending along the second direction (Y) and arranged along the first direction (X). Each of the second electrode strings (x1, x2, x3, x4) includes a plurality of second electrodes 12 connected in series.

The first controller 64 is coupled to the first touch panel 61 and the main module 4, receives the first sensing output from the first touch panel 61, and is capable of generating a first input signal based on the first sensing output received thereby. In this embodiment, the first input signal is associated with control of a cursor on a visual display displayed on the flat display 3, and scrolling the visual display displayed on the flat display.

The second controller 65 is coupled to the second touch panel 62 and the main module 4, receives the second sensing output from the second touch panel 62, and is capable of generating a second input signal based on the second sensing output received thereby. In this embodiment, the second operating area 620 is patterned with a plurality of numeral keys 621 and operator keys 622 arranged in an array (see FIG. 3). Thus, the second input signal is associated with input data of numerals or mathematics operators that will be displayed on the flat display 3.

The third controller 66 is coupled to the third touch panel 63 and the main module 4, receives the third sensing output from the third touch panel 63, and is capable of generating a third input signal based on the third sensing output received thereby. In this embodiment, the third operating area 630 is patterned with a plurality of express keys arranged in an array (see FIG. 3), each of which denotes an individual express function. For example, the express icon 631 denotes a mute function, the express key 632 denotes a fast forward function, and the express key 633 denotes a fast backward function. Thus, the third input signal is associated with express function control.

In this embodiment, the main module 4 is capable of activating each of the first, second and third controllers 64, 65, 66 to generate a corresponding one of the first, second and third input signals.

The control switch unit 7 is disposed in the main housing 1 and is connected electrically to the main module. The control switch unit 7 is operable to output a control signal to the main module 4 such that the main module 4 controls activation or deactivation of each of the first, second and third controllers 64, 65, 66 based on the control signal from the control switch unit 7. It is noted the input signal outputted to the main module 4 is one of the first, second and third input signals generated by a corresponding one of the first, second and third controllers 64, 65, 66 activated by the main module 4. In this embodiment, the control switch unit 7 includes a mechanical control key 71 mounted on the mounting surface 11 of the main housing 1. The control switch unit 7 generates the control signal in response to the number of times of pressing the control key 71. Alternatively, the control key 71 can be in the form of a touch key. For example, the main module 4 activates the first controller 64 and deactivates the second and third controller 65, 66 based on the control signal generated by the control switch unit 7 in response to pressing the control key 71 once. The main module 4 activates the second controller 65 and deactivates the first and third controllers 64, 66 based on the control signal generated by the control switch unit 7 in response to pressing the control key 71 two times continuously. The main module 4 activates the third controller 66 and deactivates the first and second controllers 64, 65 based on the control signal generated by the control switch unit 7 in response to pressing the control key 71 three times continuously. The main module 4 activates the first and second controllers 64, 65 and deactivates the third controller 66 based on the control signal generated by the control switch unit 7 in response to pressing the control key 71 four times continuously. The main module 4 activates the second and third controllers 65, 66 and deactivates the first controller 64 based on the control signal generated by the control switch unit 7 in response to pressing the control key 71 five times continuously. The main module 4 activates the first and third controllers 64, 66 and deactivates the second controller 65 based on the control signal generated by the control switch unit 7 in response to pressing the control key 71 six times continuously. The main module 4 activates all the first, second and third controllers 64, 65, 66 based on the control signal generated by the control switch unit 7 in response to pressing the control key 71 seven times continuously. A plurality of indicators (not shown), which correspond respectively to the first, second and third operating areas 610, 620, 630, can be provided on the mounting surface 11 of the main housing 1 for indicating the use status of the touch input unit 6.

A cover plate 8 is mounted detachably on the mounting surface 11 of the main housing 1 for covering the first, second and third operating areas 610, 620, 630 of the touch input unit 6 when the touch input unit 6 is not used.

Figure 5:
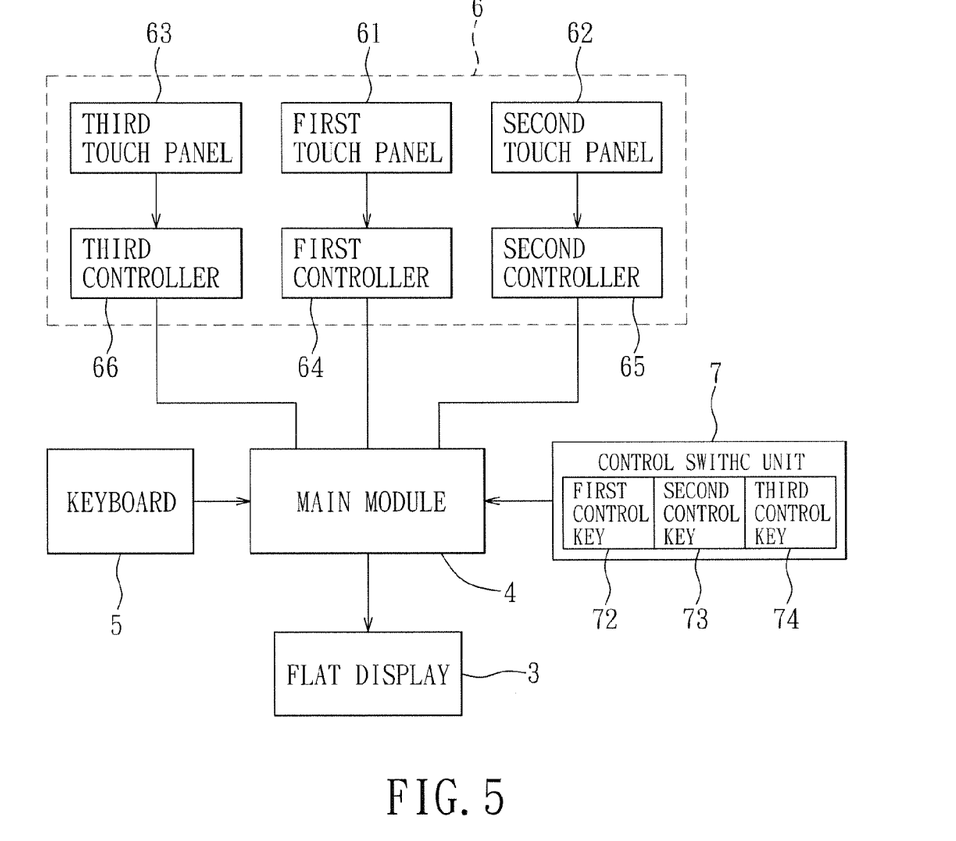
FIG. 5 is a schematic circuit block diagram illustrating the second preferred embodiment of a portable electronic device according to the present invention.

FIG. 5 illustrates the second preferred embodiment of a portable electronic device according to this invention, which is a modification of the first preferred embodiment. In this embodiment, the control switch unit 7 includes a first control key 72, a second control key 73 and a third control key 74 mounted on the mounting surface of the main housing. The control switch unit 7 generates the control signal in response to pressing at least one of the first, second and third control keys 72, 73, 74. More specifically, the main module 4 activates the first controller 64 and deactivates the second and third controllers 65, 66 based on the control signal generated by the control switch unit 7 in response to pressing the first control key 72. The main module 4 activates the second controller 65 and deactivates the first and third controllers 64, 66 based on the control signal generated by the control switch unit 7 in response to pressing the second control key 73. The main module activates the third controller 66 and deactivates the first and second controllers 64, 65 based on the control signal generated by the control switch unit 7 in response to pressing the third control key 74. The main module 4 activates the first and second controllers 64, 65 and deactivates the third controller 66 based on the control signal generated by the control switch unit 7 in response to pressing the first and second control keys 72, 73. The main module 4 activates the second and third controllers 65, 66 and deactivates the first controller 64 based on the control signal generated by the control switch unit 7 in response to pressing the second and third control keys 73, 74. The main module 4 activates the first and third controllers 64, 66 and deactivates the second controller 65 based on the control signal generated by the control switch unit 7 in response to pressing the first and third control keys 72, 74. The main module 4 activates the first, second and third controllers 64, 65, 66 based on the control signal generated by the control switch unit in response to pressing the first, second and third control keys 7, 73, 74. Each of the first, second and third control keys 72, 73, 74 is in the form of one of a mechanical press key and a touch key.

Figure 6:
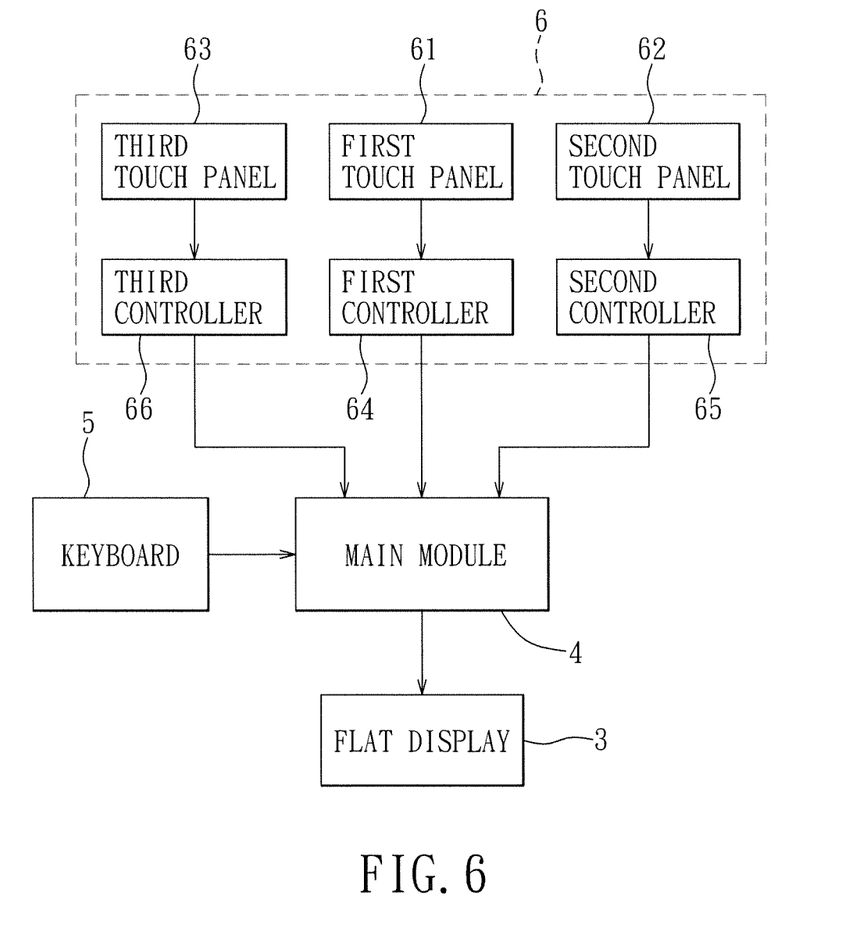
FIG. 6 is a schematic circuit block diagram illustrating the third preferred embodiment of a portable electronic device according to the present invention.

FIG. 6 illustrates the third preferred embodiment of a portable electronic device according to this invention, which is a modification of the first preferred embodiment. Unlike the previous embodiments, the control switch unit is omitted.

In addition, each of the first, second and third controllers 64, 65, 66 further detects, based on a corresponding one of the first, second and third sensing outputs from the first, second and third touch panels 61, 62, 63, whether a touch area of a single-touch point on a corresponding one of the first, second and touch panels 61, 62, 63 (i.e., the first, second and third operating areas) is greater than a predetermined area and whether there is a multi-touch point on the corresponding one of the first, second and third touch panels 61, 62, 63. Each of the first, second and third controllers 64, 65, 66 ceases to generate a corresponding one of the first, second and third input signals upon determining that the touch area of the single-touch point on the corresponding one of the first, second and third touch panels 61, 62, 63 is greater than the predetermined area or that first predetermined movement of a multi-touch point on the corresponding one of said first, second and third touch panels 61, 62, 63 exists until second predetermined movement of a multi-touch point on the corresponding one of the first, second and third touch panels 61, 62, 63 is determined. For example, the first controller 64 ceases to generate the first input signal corresponding to the sensing output from the first touch panel 611 upon two-finger dragging touch motion on the first touch panel 61. Thereafter, the first controller 64 is capable of generating the first input signal again upon two-finger striking touch on the first touch panel 61. In this example, two-finger dragging touch motion serves as the first predetermined movement of a multi-touch point, and two-finger striking touch serves as the second predetermined movement of a multi-touch point.

Figure 7:
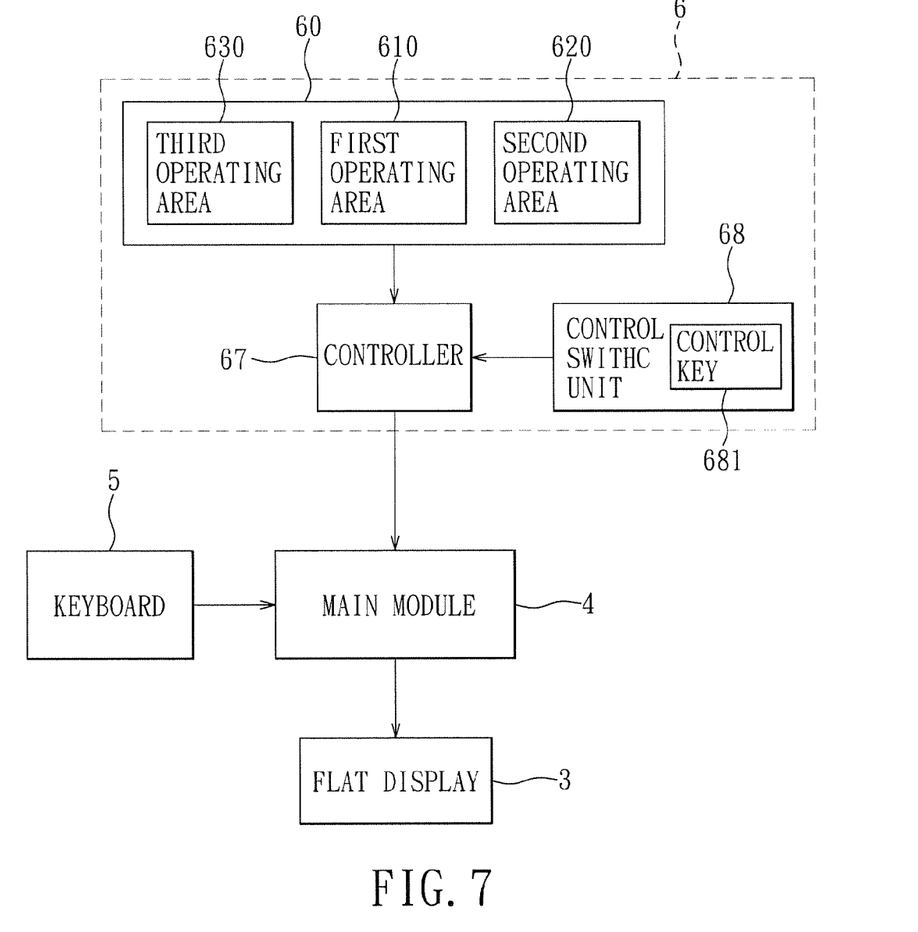
FIG. 7 is a schematic circuit block diagram illustrating the fourth preferred embodiment of a portable electronic device according to the present invention.

FIG. 7 illustrates the fourth preferred embodiment of a portable electronic device according to this invention, which is a modification of the first preferred embodiment. Unlike the first preferred embodiment, the touch input unit 6 includes a touch panel 60, a controller 67, and a control switch unit 68.

The touch panel 60 is configured with the first, second and third operating areas 610, 620, 630. In this embodiment, the touch panel 60 is formed by integrating the first, second and third touch panels 61, 62, 63 of the first preferred embodiment onto the same substrate. As such, the touch panel 60 is configured with the first, second and third operating areas 610, 620, 630, and is capable of generating the first, second and third sensing outputs.

The controller 67 is coupled to the touch panel 60 and the main module 4, and receives the first, second and third sensing outputs from the touch panel 60. The controller 67 is capable of generating the first input signal based on the first sensing output, generating the second input signal based on the second sensing output, and generating the third input signal based on the third sensing output. One of the first, second and third input signals is outputted by the controller 67 to the main module 4, and serves as the input signal.

The control switch unit 68 is connected electrically to the controller 67, and is operable to output a control signal to the controller 67. The controller 67 selects at least one of the first, second and third sensing outputs from the touch panel 60 based on the control signal from the control switch unit 68 to generate a corresponding one of the first, second and third input signals. In this embodiment, the control switch unit 68 includes a control key 681 mounted on the mounting surface of the main housing. The control switch unit 68 generates the control signal in response to the number of times of pressing the control key 681. In addition, the control key 681 can be in the form of one of a mechanical press key and a touch key. More specifically, the controller 67 is capable of selecting the first sensing output from the touch panel 60 based on the control signal generated by the control switch unit 7 in response to pressing the control key 681 once, thereby generating the first input signal that serves as the input signal outputted to the main module 4. The controller 67 is capable of selecting the second sensing output from the touch panel 60 based on the control signal generated by the control switch unit 68 in response to pressing the control key 681 two times continuously, thereby generating the second input signal that serves as the input signal outputted to the main module 4. The controller 67 is capable of selecting the third sensing output from the touch panel 60 based on the control signal generated by the control switch unit 68 in response to pressing the control key 681 three times continuously, thereby generating the third input signal that serves as the input outputted to the main module 4. The controller 67 is capable of selecting the first and second sensing outputs from the touch panel 60 based on the control signal generated by the control switch unit 68 in response to pressing the control key 681 four times continuously, thereby generating one of the first and second input signals that serves as the input signal outputted to the main module 4. The controller 67 is capable of selecting the second and third sensing outputs from the touch panel 60 based on the control signal generated by the control switch unit 68 in response to pressing the control key 681 five times continuously, thereby generating one of the second and third input signals that serves as the input signal outputted to the main module 4. The controller 67 is capable of selecting the first and third sensing outputs from the touch panel 60 based on the control signal generated by the control switch unit 68 in response to pressing the control key 681 six times continuously, thereby generating one of the first and third input signals that serves as the input signal outputted to the main module 4. The controller 67 is capable of selecting the first, second and third sensing outputs from the touch panel 60 based on the control signal generated by the control switch unit 68 in response to pressing the control key 681 seven times continuously, thereby generating one of the first, second and third input signals that serves as the input signal outputted to the main module 4. Similar to the first preferred embodiment, a plurality of indicators (not shown), which correspond respectively to the first, second and third operating areas 610, 620, 630, can be provided on the mounting surface of the main housing for indicating the use status of the touch input unit 6.

Figure 8:
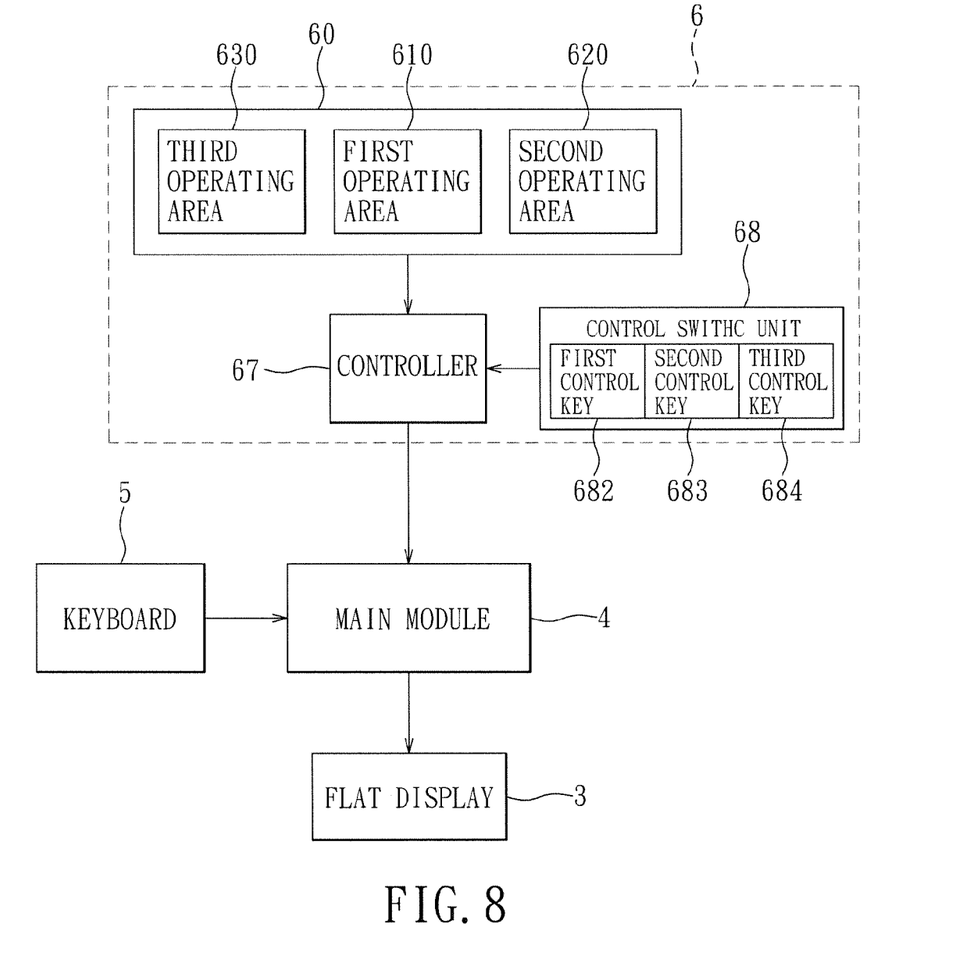
FIG. 8 is a schematic circuit block diagram illustrating the fifth preferred embodiment of a portable electronic device according to the present invention.

FIG. 8 illustrates the fifth preferred embodiment of a portable electronic device according to this invention, which is a modification of the fourth preferred embodiment. In this embodiment, the control switch unit 68 includes a first control key 682, a second control key 683, and a third control key 684 mounted on the mounting surface of the main housing. Each of the first, second and third control keys 682, 683, 684 can be in the form of one of a mechanical press key and a touch key. The control switch unit 68 generates the control signal in response to pressing at least one of the first, second and third control keys 682, 683, 684. More specifically, the controller 67 is capable of selecting the first sensing output from the touch panel 60 based on the control signal generated by the control switch unit 7 in response to pressing the first control key 682, thereby generating the first input signal that serves as the input signal outputted to the main module 4. The controller 67 is capable of selecting the second sensing output from the touch panel 60 based on the control signal generated by the control switch unit 68 in response to pressing the second control key 683, thereby generating the second input signal that serves as the input signal outputted to the main module 4. The controller 67 is capable of selecting the third sensing output from the touch panel 60 based on the control signal generated by the control switch unit 68 in response to pressing the third control key 684, thereby generating the third input signal that serves as the input outputted to the main module 4. The controller 67 is capable of selecting the first and second sensing outputs from the touch panel 60 based on the control signal generated by the control switch unit 68 in response to pressing the first and second control keys 682, 683, thereby generating one of the first and second input signals that serves as the input signal outputted to the main module 4. The controller 67 is capable of selecting the second and third sensing outputs from the touch panel 60 based on the control signal generated by the control switch unit 68 in response to pressing the second and third control keys 683, 684, thereby generating one of the second and third input signals that serves as the input signal outputted to the main module 4. The controller 67 is capable of selecting the first and third sensing outputs from the touch panel 60 based on the control signal generated by the control switch unit 68 in response to pressing the second and third control keys 683, 684, thereby generating one of the first and third input signals that serves as the input signal outputted to the main module 4. The controller 67 is capable of selecting the first, second and third sensing outputs from the touch panel 60 based on the control signal generated by the control switch unit 68 in response to pressing the first, second and third control keys 682, 683, 684, thereby generating one of the first, second and third input signals that serves as the input signal outputted to the main module 4.

Figure 9:
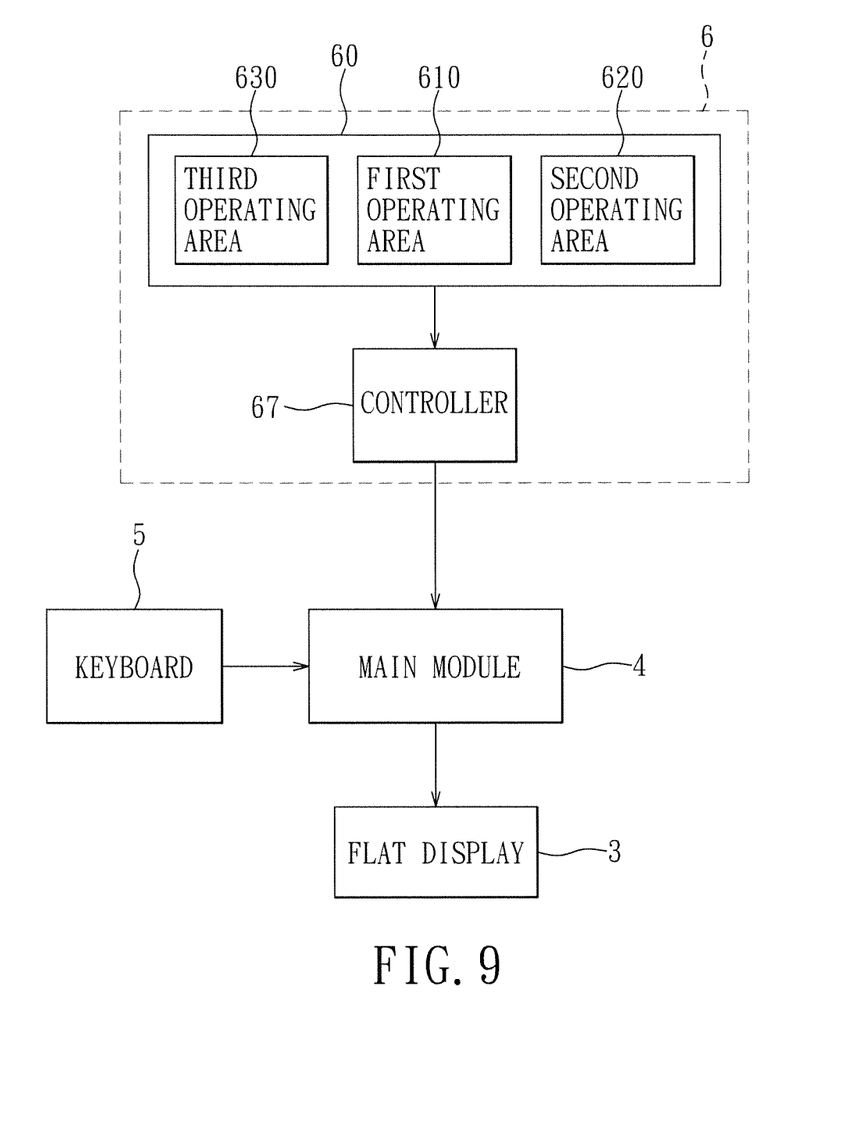
FIG. 9 is a schematic circuit block diagram illustrating the sixth preferred embodiment of a portable electronic device according to the present invention.

FIG. 9 illustrates the sixth preferred embodiment of a portable electronic device according to this invention, which is a modification of the first preferred embodiment. Unlike the fourth and fifth preferred embodiments, the control switch unit of the touch input unit is omitted.

In addition, the controller 67 further detects, based on each of the first, second and third sensing outputs from the touch panel 60, whether a touch area of a single-touch point on a corresponding one of the first, second and third operating areas 610, 620, 630 is greater than a predetermined area and whether there is a multi-touch point on the corresponding one of the first, second and third operating areas 610, 620, 630. Then, the controller 67 ceases to generate a corresponding one of the first, second and third input signals upon determining that the touch area of the single-touch point on the corresponding one of the first, second and third operating areas 610, 620, 630 is greater than the predetermined area or that first predetermined movement of a multi-touch point on the corresponding one of said first, second and third operating areas 610, 620, 630 exists until second predetermined movement of a multi-touch point on the corresponding one of the first, second and third operating areas 610, 620, 630 is determined. For example, the controller 67 ceases to generate the first input signal corresponding to the first sensing output from the touch panel 60 upon two-finger dragging touch motion on the first operating area 610. Thereafter, the controller 67 is capable of generating the first input signal again upon two-finger striking touch on the first operating area 610. In this example, two-finger dragging touch motion serves as the first predetermined movement of a multi-touch point, and two-finger striking touch serves as the second predetermined movement of a multi-touch point.

In sum, due to the presence of the touch input unit 6 with the first, second and third operating areas 610, 620, 630 corresponding respectively to different functions, the main module 4 of the portable electronic device can easily and exactly perform a desired operation corresponding to the input signal generated by the touch input unit 6 under control of the control switch unit 7, 67 or specific gestures.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A portable electronic device:
   a main housing having a mounting surface;
   a main module disposed in said main housing;
   a keyboard mounted on said mounting surface of said main housing and connected electrically to said main module; and
   a touch input unit mounted to said main housing and connected electrically to said main module, said touch input unit having first, second and third operating areas spaced apart from each other and exposed from said mounting surface of said main housing, said touch input unit being capable of generating an input signal corresponding to at least one touch point on any one of said first, second and third operating areas, and outputting the input signal to said main module such that said main module performs an operation corresponding to the input signal from said touch input unit.

2. The portable electronic device as claimed in claim 1, wherein:
   said touch input unit includes
      a first touch panel configured with said first operating area and operable to generate a first sensing output in response to at least one touch point on said first operating area,
      a second touch panel configured with said second operating area and operable to generate a second sensing output in response to at least one touch point on said second operating area,
      a third touch panel configured with said third operating area and operable to generate a third sensing output in response to at least one touch point on said third operating area,
      a first controller coupled to said first touch panel and said main module, receiving the first sensing output from said first touch panel, and capable of generating a first input signal based on the first sensing output received thereby,
      a second controller coupled to said second touch panel and said main module, receiving the second sensing output from said second touch panel, and capable of generating a second input signal based on the second sensing output received thereby, and a third controller coupled to said third touch panel and said main module, receiving the third sensing output from said third touch panel, and capable of generating a third input signal based on the third sensing output received thereby; and the input signal outputted by said touch input unit is one of the first, second and third input signals generated respectively by said first, second and third controllers.

3. The portable electronic device as claimed in claim 2, wherein each of said first, second and third controllers further detects, based on a corresponding one of the first, second and third sensing outputs from said first, second and third touch panels, whether a touch area of a single-touch point on a corresponding one of said first, second and third operating areas is greater than a predetermined area and whether there is a multi-touch point on the corresponding one of said first, second and third operating areas, and ceases to generate a corresponding one of the first, second and third input signals upon determining that the touch area of the single-touch point on the corresponding one of said first, second and third operating areas is greater than the predetermined area or that first predetermined movement of a multi-touch point on the corresponding one of said first, second and third operating areas exists until second predetermined movement of a multi-touch point on the corresponding one of said first, second and third operating areas is determined.

4. The portable electronic device as claimed in claim 2, wherein said main module is capable of activating each of said first, second and third controllers to generate a corresponding one of the first, second and third input signals, said portable electronic device further comprising a control switch unit disposed in said main housing, connected electrically to said main module, and operable to output a control signal to said main module such that said main module controls activation or deactivation of each of said first, second and third controllers based on the control signal from said control switch unit.

5. The portable electronic device as claimed in claim 4, wherein said control switch unit includes a control key mounted on said mounting surface of said main housing, said control switch unit generating the control signal in response to the number of times of pressing said control key.

6. The portable electronic device as claimed in claim 4, wherein:

said control switch unit includes first, second and third control keys mounted on said mounting surface of said main housing, and generates the control signal in response to pressing at least one said first, second and third control keys;

said main module activates said first controller and deactivates said second and third controllers based on the control signal generated by said control switch unit in response to pressing said first control key;

said main module activates said second controller and deactivates said first and third controllers based on the control signal generated by said control switch unit in response to pressing said second control key;

said main module activates said third controller and deactivates said first and second controllers based on the control signal generated by said control switch unit in response to pressing said third control key;

said main module activates said first and second controllers and deactivates said third controller based on the control signal generated by said control switch unit in response to pressing said first and second control keys;

said main module activates said second and third controllers and deactivates said first controller based on the control signal generated by said control switch unit in response to pressing said second and third control keys;

said main module activates said first and third controllers and deactivates said second controller based on the control signal generated by said control switch unit in response to pressing said first and third control keys; and said main module activates said first, second and third controllers based on the control signal generated by said control switch unit in response to pressing said first, second and third control keys.

7. The portable electronic device as claimed in claim 1, wherein said touch input unit includes:

a touch panel configured with said first, second and third operating areas, and capable of generating a first sensing output in response to at least one touch point on said first operating area, generating a second sensing output in response to at least one touch point on said second operating area, and generating a third sensing output in response to at least one touch point on said third operating area; and a controller coupled to said touch panel and said main module, and receiving the first, second and third sensing outputs from said touch panel, said controller being capable of generating a first input signal based the first sensing output, generating a second input signal based on the second sensing output, and gene rating a third input signal based on the third sensing output, the input signal being one of the first, second and third input signals and being outputted from said controller to said main module.

8. The portable electronic device as claimed in claim 7, wherein said controller further detects, based on each of the first, second and third sensing outputs from said touch panel, whether a touch area of a single-touch point on a corresponding one of said first, second and third operating areas is greater than a predetermined area and whether there is a multi-touch point on the corresponding one of said first, second and third operating areas, and ceases to generate a corresponding one of the first, second and third input signals upon determining that the touch area of the single-touch point on the corresponding one of said first, second and third operating areas is greater than the predetermined area or that first predetermined movement of a multi-touch point on the corresponding one of said first, second and third operating areas exists until second predetermined movement of a multi-touch point on the corresponding one of said first, second and third operating areas is determined.

9. The portable electronic device as claimed in claim 7, wherein:

said touch input unit further includes a control switch unit connected electrically to said controller, and operable to output a control signal to said controller;

said controller of said touch input unit is capable of selecting at least one of the first, second and third sensing outputs from said touch panel based on the control signal from said control switch unit so as to generate corresponding at least one of the first, second and third input signals.

10. The portable electronic device as claimed in claim 9, wherein said control switch unit includes a control key, and generates the control signal in response to the number of times of pressing said control key.

11. The portable electronic device as claimed in claim 9, wherein:
said control switch unit includes a first control key, a second control key and a third control key, and generates the control signal in response to pressing at least one of said first, second and third control keys;
said controller is capable of selecting the first sensing output from said touch panel based on the control signal generated by said control switch unit in response to pressing said first control key;
said controller is capable of selecting the second sensing output from said touch panel based on the control signal generated by said control switch unit in response to pressing said second control key;
said controller is capable of selecting the third sensing output from said touch panel based on the control signal generated by said control switch unit in response to pressing said third control key;
said controller is capable of selecting the first and second sensing outputs from said touch panel based on the control signal generated by said control switch unit in response to pressing said first and second control keys;
said controller is capable of selecting the second and third sensing outputs from said touch panel based on the control signal generated by said control switch unit in response to pressing said second and third control keys;
said controller is capable of selecting the first and third sensing outputs from said touch panel based on the control signal generated by said control switch unit in response to pressing said first and third control keys; and
said controller is capable of selecting the first, second and third sensing outputs from said touch panel based on the control signal generated by said control switch unit in response to pressing said first, second and third control keys.

12. The portable electronic device as claimed in claim 1, wherein the input signal is associated with one of cursor control, numeral data input, and express function control.

13. The portable electronic device as claimed in claim 1, further comprising a cover plate mounted detachably on said mounting surface of said main housing for covering said first, second and third operating areas of said touch input unit.

* * * * *